(12) United States Patent
Cudak et al.

(10) Patent No.: US 9,411,408 B2
(45) Date of Patent: Aug. 9, 2016

(54) LOAD OPTIMIZATION USING CABLE-ASSOCIATED VOLTAGE DROP

(71) Applicant: Lenovo Enterprise Solutions (Singapore) Pte. Ltd., Singapore (SG)

(72) Inventors: Gary D. Cudak, Wake Forest, NC (US); Michael DeCesaris, Carrboro, NC (US); Luke D. Remis, Raleigh, NC (US); Brian C. Totten, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 183 days.

(21) Appl. No.: 14/265,405

(22) Filed: Apr. 30, 2014

(65) Prior Publication Data

US 2015/0316973 A1 Nov. 5, 2015

(51) Int. Cl.
*G06F 1/26* (2006.01)
*G06F 1/32* (2006.01)
*G06F 1/00* (2006.01)

(52) U.S. Cl.
CPC ........................................ *G06F 1/329* (2013.01)

(58) Field of Classification Search
CPC ........................................................ G06F 1/329
USPC ................................................... 713/320, 323
See application file for complete search history.

(56) References Cited

U.S. PATENT DOCUMENTS

| | | | |
|---|---|---|---|
| 8,458,500 B2 | 6/2013 | Akers et al. | |
| 8,589,931 B2 | 11/2013 | Barsness et al. | |
| 2009/0109230 A1* | 4/2009 | Miller | G06F 1/3203 345/506 |
| 2010/0124196 A1* | 5/2010 | Bonar | H04B 7/0689 370/329 |
| 2012/0131360 A1* | 5/2012 | Zyren | H04L 12/10 713/310 |
| 2012/0326503 A1* | 12/2012 | Birkelund | G06Q 10/04 307/24 |
| 2013/0103218 A1 | 4/2013 | Das et al. | |
| 2014/0316598 A1* | 10/2014 | Yang | H02J 3/14 700/295 |
| 2015/0169382 A1* | 6/2015 | Anderson | G06F 9/5094 718/104 |

OTHER PUBLICATIONS

Wikipedia, "Copper loss", Copper loss—Wikipedia, the free encyclopedia, http://en.wikipedia.org/wiki/Copper_loss, accessed on Apr. 8, 2014, pp. 1-2.
"Voltage Drop Calculator", NoOutage.Com LLC, Voltage Drop Calculator—for single and 3 phase ac systems and dc systems, http://www.nooutage.com/vdrop.htm, accessed on Feb. 14, 2014, pp. 1-3.

\* cited by examiner

*Primary Examiner* — Robert Cassity
(74) *Attorney, Agent, or Firm* — Katherine S. Brown; Jeffrey L. Streets

(57) ABSTRACT

According to one exemplary embodiment, a method for load optimization using cable-associated voltage drop is provided. The method may include receiving a plurality of tasks for processing by a plurality of electronic devices. The method may also include determining a power loss value for one or more power cables powering each of the plurality of electronic devices. The method may further include assigning the plurality of tasks to one or more of the plurality of electronic devices based on the power loss value for the one or more power cables powering each of the plurality of electronic devices.

15 Claims, 3 Drawing Sheets

LOAD OPTIMIZATION USING CABLE-ASSOCIATED VOLTAGE DROP

BACKGROUND

The present invention relates generally to the field of computing, and more particularly to optimizing electronic device loads.

Power management is an increasingly important consideration with the proliferation of computers and other electronic devices. Reducing the energy used by electronic devices provides many advantages, such as reducing costs, increasing electronic device longevity and reducing heat production. For example, in a datacenter containing servers used in cloud computing, the energy required to power processors and attendant cooling systems may represent a significant operating expense.

SUMMARY

According to one exemplary embodiment, a method for load optimization using cable-associated voltage drop is provided. The method may include receiving a plurality of tasks for processing by a plurality of electronic devices. The method may also include determining a power loss value for one or more power cables powering each of the plurality of electronic devices. The method may further include assigning the plurality of tasks to one or more of the plurality of electronic devices based on the power loss value for the one or more power cables powering each of the plurality of electronic devices.

According to another exemplary embodiment, a computer system for load optimization using cable-associated voltage drop is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include receiving a plurality of tasks for processing by a plurality of electronic devices. The method may also include determining a power loss value for one or more power cables powering each of the plurality of electronic devices. The method may further include assigning the plurality of tasks to one or more of the plurality of electronic devices based on the power loss value for the one or more power cables powering each of the plurality of electronic devices.

According to yet another exemplary embodiment, a computer program product for load optimization using cable-associated voltage drop is provided. The computer program product may include one or more computer-readable storage devices and program instructions stored on at least one of the one or more tangible storage devices, the program instructions executable by a processor. The computer program product may include program instructions to receive a plurality of tasks for processing by a plurality of electronic devices. The computer program product may also include program instructions to determine a power loss value for one or more power cables powering each of the plurality of electronic devices. The computer program product may further include program instructions to assign the plurality of tasks to one or more of the plurality of electronic devices based on the power loss value for the one or more power cables powering each of the plurality of electronic devices.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
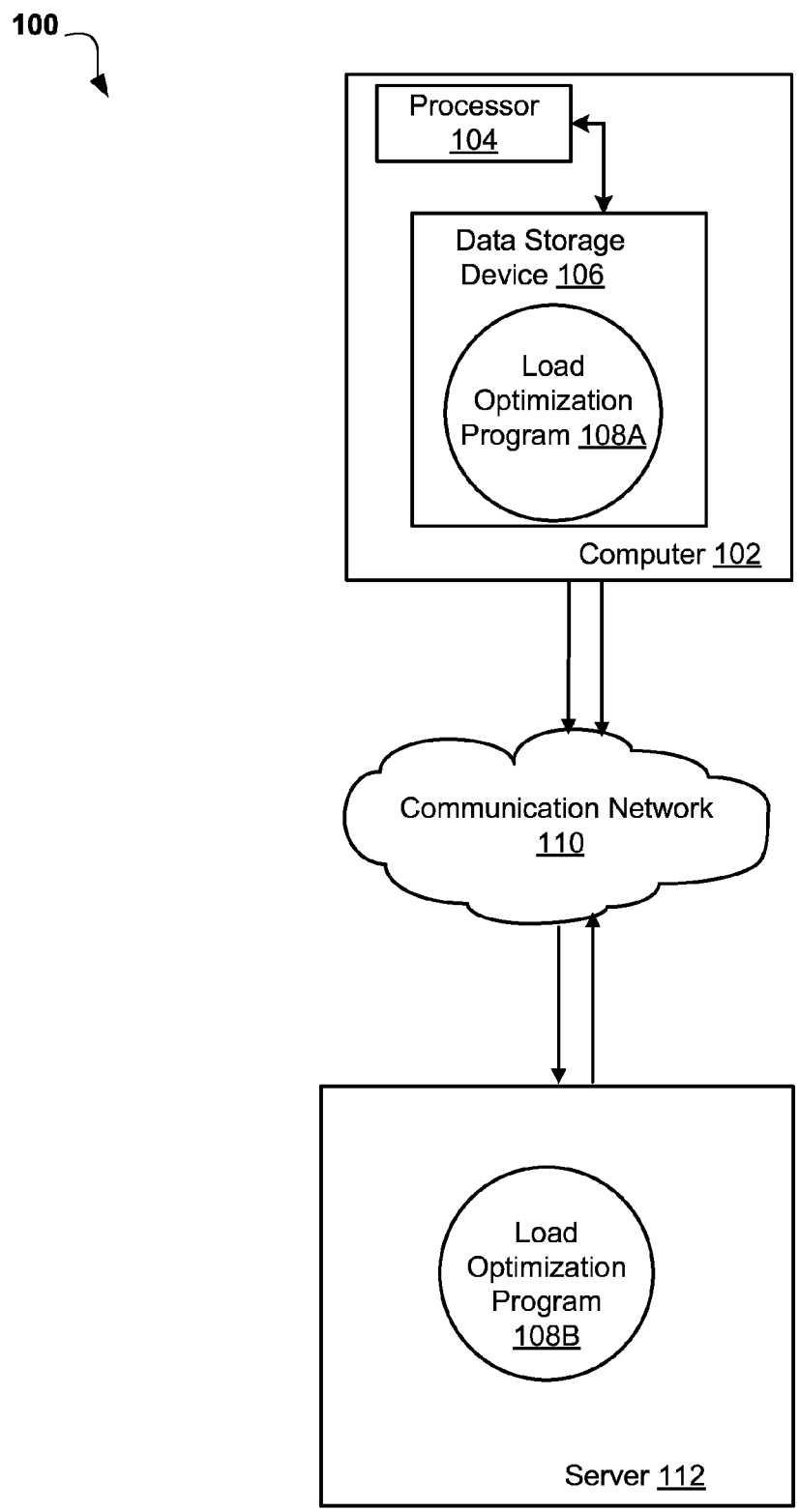
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to optimizing electronic device loads. The following described exemplary embodiments provide a system, method and program product for load optimization using cable-associated voltage drop.

One aspect of reducing power consumption that is currently neglected is taking into account voltage drop from the cables used between a power source and an electronic device which is consuming energy. This voltage drop occurs when some of the electrical current travelling through a conductive material, such as copper wire, is lost from an undesirable energy transfer to heat. Therefore it may be advantageous, among other things, to bias job or workload distribution based on the efficiency characteristics of the power cables used to provide energy to electronic devices.

According to at least one implementation of the present embodiment, computing tasks are assigned to electronic devices for processing according to the smallest expected cable power loss. By minimizing energy lost as heat, energy efficiency is increased and operating costs are reduced.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for load optimization using cable-associated voltage drop.

Referring now to FIG. 1, an exemplary networked computer environment 100 in accordance with one embodiment is depicted. The networked computer environment 100 may include a computer 102 with a processor 104 and a data storage device 106 that is enabled to run a load optimization using cable-associated voltage drop program 108A. The networked computer environment 100 may also include a server 112 that is enabled to run a load optimization using cable-associated voltage drop program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively and client computer 102 may include internal components 800b and external components 900b, respectively. Client computer 102 may be, for example, a mobile device, a telephone, a PDA, a netbook, a laptop computer, a tablet computer, a desktop computer, or any type of computing device capable of running a program and accessing a network.

A program, such as a load optimization using cable-associated voltage drop program 108A and 108B may run on the client computer 102 or on the server computer 112. The load optimization using cable-associated voltage drop program 108A and 108B may be utilized to reduce energy loss by assigning tasks to a server computer 112 or other electronic device based on minimizing cable-associated energy loss. For example, a user using a load optimization using cable-associated voltage drop program 108A, running on a client computer 102 may connect via a communication network 110 to server computer 112 which may also be running a load optimization using cable-associated voltage drop program 108B. Furthermore, the user using client computer 102 or server computer 112 may utilize the load optimization using cable-associated voltage drop program 108A and 108B to reduce energy loss in cables supplying power to an electronic device such as a client computer 102 or a server computer 112. The load optimization using cable-associated voltage drop program 108A and 108B is explained in further detail below with respect to FIG. 2.

Figure 2:
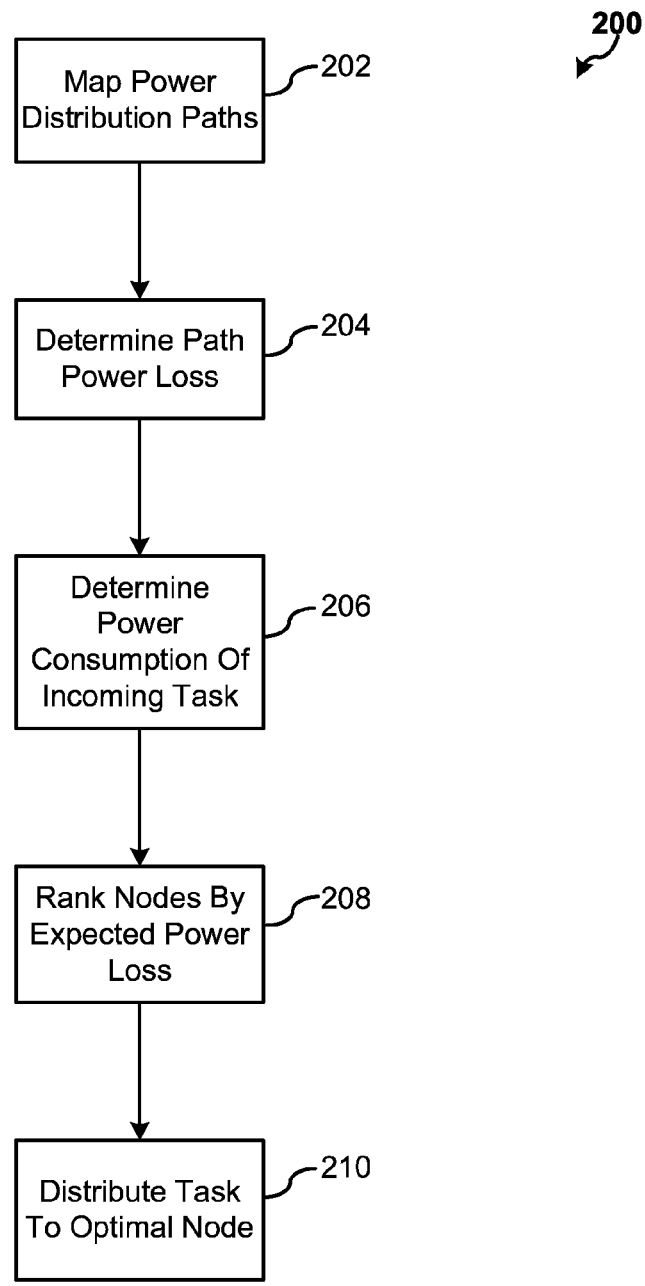
FIG. 2 is an operational flow chart illustrating a program for load optimization using cable-associated voltage drop according to at least one embodiment.

Referring now to FIG. 2, an operational flow chart illustrating the exemplary process 200 by the load optimization using cable-associated voltage drop program 108A and 108B (FIG. 1) according to at least one embodiment is depicted. At 202, the process 200 maps power distribution paths to one or more electrical device nodes. Each path may include one or more segments that connect a power source to a node. Segments may correspond to one or more power cables that power each node. Nodes may, for example, correspond to a single server or multiple servers in close proximity to each other. Mapping paths may include assigning a segment power loss value to each segment based on the characteristics (e.g., physical, electrical, etc.) of the power cables powering a node at the end of the segment.

According to at least one embodiment, the power cable characteristics used to assign a segment power loss value may be based on, among other things, at least one of the power cable length, power cable gauge, ambient temperature where the power cable is located, and losses due to inefficient electrical connections present in the power cables (e.g., splices, protection circuitry, breakers).

According to at least one embodiment, the power cable characteristics may be manually measured and, for example, entered into a data structure such as a database where the process 200 may access and retrieve the power cable characteristics used to determine a segment power loss value. According to at least one other embodiment, power cable characteristics may be determined by querying the power supply for a cable identification number and then, for example, using the cable identification number to look up the power cable characteristics associated with that cable identification number in a table listing power cable characteristics stored in a data structure such as a database.

Once the power cable characteristics are identified, the process 200 may calculate the total segment power loss value. The segment power loss value may, according to at least one implementation, be determined by calculating the cable power loss value of each cable in the segment using the following formula:

$$\text{Cable Power Loss} = I^2 \times R$$

In other words, the cable power loss is equal to the current flowing through the power cable conductor I squared, multiplied by the resistance of the power cable conductor R. The power cable loss may be influenced by the power cable characteristics as discussed above (e.g., power cable length, power cable gauge, etc.) and incorporated into the cable power loss calculation. For example, the power cable characteristics may correspond to increased resistance R, thereby increasing the resulting cable power loss value.

It may be appreciated that a node may receive power from more than one power cable and thus a segment may include multiple power cables. The power cable characteristics for any additional power cables may differ from one another. In instances where there is more than one power cable, the power loss values for each cable may be used to determine the resulting total segment power loss value. However, in instances where a segment comprises a single power cable, the total segment power loss value may be the power cable loss value calculated for the single power cable.

Next at 204, the expected power loss of each path of the power distribution map created at 202 is determined. According to at least one embodiment, the power loss value is determined by utilizing at least one of a real-time power loss and a forecast power loss. The real-time loss may, for example, include measuring the input voltage and input current at each node. The forecast power loss may be determined based on the power used by the node for the tasks the node is currently processing.

Then at 206, the power consumption for an incoming task is determined. This determination may be made, according to at least one embodiment, by utilizing a data structure, such as a database, having records of the power consumed while processing previous tasks having the same task type as the incoming task. Additionally, the data structure may contain the execution time necessary to complete previous tasks of the same task type as the incoming task. The process 200 may then, according to at least one embodiment, combine the power consumption and execution time of previously processed tasks of the same task type to determine the expected power consumption of the incoming task.

At 208, each node in the power distribution map is ranked based on the expected power loss from processing the incoming task. According to at least one embodiment, the expected power loss for each node may include combining the path power loss value, as determined at 204, with the expected power consumption of the incoming task, as determined at 206. The result of combining the path power loss value and expected task power consumption may, for example, produce a single value representing the total expected power loss for processing the incoming task at the node. The process 200 may then be repeated for each node in the power distribution map to produce total expected power loss values representing the power loss for each node to compute the incoming task. Then, according to at least one embodiment, the expected power loss values for all of the nodes may be ranked from the node with the lowest expected power loss value to the node with the greatest expected power loss value.

Next, at 210, the incoming task is distributed to an optimal node. According to at least one embodiment, the node having the lowest expected power loss may be the optimal node and may be sent the incoming task for processing. According to at least one other embodiment, the wear level of electronic devices associated with each node may be factored with the expected power loss to determine the optimal node for the incoming task. For example, the amount of wear for electronic devices associated with each node may be monitored and recorded in a database. Nodes having electronic devices with less wear may be more optimal, and may be biased to rank more optimally, than nodes having electronic devices with greater wear. Therefore, according to this example, nodes having lower expected power loss and electronic devices with less wear may be more optimal than nodes having higher expected power loss and electronic devices with greater wear.

The process 200 may, according to at least one embodiment, also make recommendations to exchange electronic devices at nodes based on the observed wear levels. For example, electronic devices associated with nodes at the end of lower power loss paths will tend to receive more tasks than electronic devices associated with nodes at the end of higher power loss paths. Therefore, electronic devices associated with nodes at the end of lower power loss paths will have increased wear compared to electronic devices associated with nodes at the end of higher power loss paths. Thus the process 200 may recommend that electronic devices associated with nodes at the end of lower power loss paths be swapped with electronic devices associated with nodes at the end of higher power loss paths for equalizing wear of the electronic devices.

Figure 3:
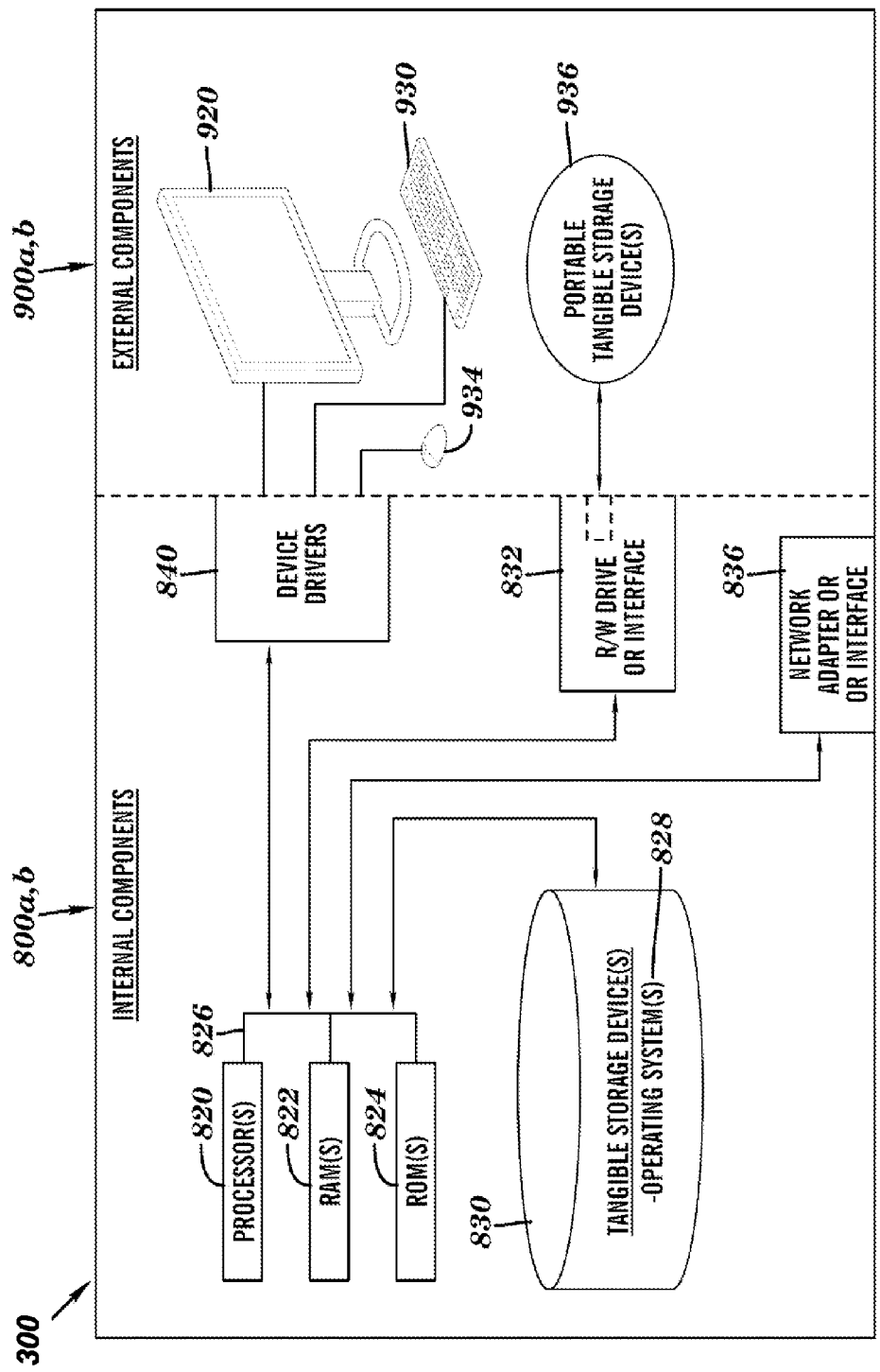
FIG. 3 is a block diagram of internal and external components of computers and servers depicted in FIG. 1 according to at least one embodiment.

FIG. 3 shows a block diagram 300 of the exemplary components of a data processing system 800, 900 that may execute the load optimization using cable-associated voltage drop program 108A and 108B (FIG. 1) in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 3. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a load optimization using cable-associated voltage drop program 108A and 108B (FIG. 1) given by processes 200 (FIG. 2), may be stored on one or more computer-readable tangible storage devices 830 for execution by one or more processors 820 via one or more RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The load optimization using cable-associated voltage drop program 108A and 108B (FIG. 1) can be stored on one or more of the respective portable computer-readable tangible storage devices 936, read via the respective R/W drive or interface 832 and loaded into the respective hard drive 830.

Each set of internal components 800 a, b may also include network adapters (or switch port cards) or interfaces 836 such as a TCP/IP adapter cards, wireless wi-fi interface cards, or 3G or 4G wireless interface cards or other wired or wireless communication links. The load optimization using cable-associated voltage drop program 108A (FIG. 1) in client computer 102 and the load optimization using cable-associated voltage drop program 108B (FIG. 1) in network server computer 112 can be downloaded from an external computer (e.g., server) via a network (for example, the Internet, a local area network or other, wide area network) and respective network adapters or interfaces 836. From the network adapters (or switch port adaptors) or interfaces 836, the load optimization using cable-associated voltage drop program 108A (FIG. 1) in client computer 102 and the load optimization using cable-associated voltage drop program 108B (FIG. 1) in network server computer 112 are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing power load associated with an electronic device, the method comprising:

receiving a plurality of tasks for processing by a plurality of electronic devices;

determining a power loss value for one or more power cables providing power from a power source to each of the plurality of electronic devices, wherein the power loss value is based on the power supplied by the power source and consumed by the plurality of electronic devices to process tasks;

determining a first expected power consumption value corresponding to at least one of the received plurality of tasks;

determining a second expected power consumption value to at least one other of the received plurality of tasks, wherein the first expected power consumption value is higher relative to the second expected power consumption value determining a first power loss value corresponding to at least one of the one or more power cables providing power from a power source to each of the plurality of electronic devices;

determining a second power loss value corresponding to at least one other of the one or more power cables providing power from a power source to each of the plurality of electronic devices, wherein the first power loss value is higher relative to the second power loss value; and assigning the plurality of tasks to one or more of the plurality of electronic devices based on the power loss value for the one or more power cables providing power to each of the plurality of electronic devices, including assigning one or more of the tasks with the second expected power consumption value to the one or more of the plurality of electronic devices having the first power loss value.

2. The method of claim 1, wherein assigning the plurality of tasks to the one or more of the plurality of electronic devices based on the power loss value for the one or more power cables providing power to each of the plurality of electronic devices comprises assigning tasks having the first expected power consumption value to the one or more of the plurality of electronic devices having the second power loss value.

3. The method of claim 1, further comprising:

mapping power distribution paths from the power source to each of the plurality of electronic devices based on at least one characteristic corresponding to each of the one or more power cables providing power to each of the plurality of electronic devices.

4. The method of claim 1, wherein the determining the power loss value comprises utilizing at least one of a power cable length value, a power cable gauge value, a temperature value, and a connector loss value.

5. The method of claim 1, wherein the determining the expected power consumption of each of the plurality of tasks comprises utilizing at least one of an expected power requirement of each task, an observed power usage of previously processed tasks, an expected duration of each task, and an observed duration of previously processed tasks.

6. A method for optimizing power load associated with an electronic device, the method comprising:

receiving a plurality of tasks for processing by a plurality of electronic devices;

determining a power loss value for one or more power cables providing power from a power source to each of the plurality of electronic devices, wherein the power loss value is based on the power supplied by the power source and consumed by the plurality of electronic devices to process tasks;

assigning the plurality of tasks to one or more of the plurality of electronic devices based on the power loss value for the one or more power cables providing power to each of the plurality of electronic devices;

measuring a wear level for each of the plurality of electronic devices; and exchanging electronic device locations based on the wear level of each of the plurality of electronic devices.

7. The method of claim 6, further comprising:

determining a first wear level based on at least one of the plurality of electronic devices;

determining a second wear level based on at least one other of the plurality of electronic devices; and wherein the first wear level is higher relative to the second wear level.

8. The method of claim 6, wherein the assigning the plurality of tasks to the one or more of the plurality of electronic devices based on the power loss value for the one or more power cables providing power to each of the plurality of electronic devices comprises assigning tasks having the first power consumption value to one or more of the plurality of electronic devices having the second wear level.

9. The method of claim 6, wherein the assigning the plurality of tasks to the one or more of the plurality of electronic devices based on the power loss value for the one or more power cables providing power to each of the plurality of electronic devices comprises assigning tasks having the second power consumption value to one or more of the plurality of electronic devices having the first wear level.

10. The method of claim 6, wherein the exchanging electronic device locations based on the wear level of each of the plurality of electronic devices comprises moving one or more electronic devices having the first wear level to the location of one or more electronic devices having the second wear level and moving one or more electronic devices having the second wear level to the location of one or more electronic devices having the first wear level.

11. A computer program product for optimizing power load associated with an electronic device, comprising:

one or more non-transitory computer-readable storage medium and program instructions stored on at least one of the one or more storage medium, the program instructions executable by a processor, the program instructions comprising:

program instructions to receive a plurality of tasks for processing by a plurality of electronic devices;

program instructions to determine a power loss value for one or more power cables providing power from a power source to each of the plurality of electronic devices, wherein the power loss value is based on the power supplied by the power source and consumed by the plurality of electronic devices to process tasks;

program instructions to determine a first expected power consumption value corresponding to at least one of the received plurality of tasks;

program instructions to determine a second expected power consumption value to at least one other of the received plurality of tasks, wherein the first expected power consumption value is higher relative to the second expected power consumption value program instructions to determine a first power loss value corresponding to at least one of the one or more power cables providing power from a power source to each of the plurality of electronic devices;

program instructions to determine a second power loss value corresponding to at least one other of the one or more power cables providing power from a power source to each of the plurality of electronic devices, wherein the first power loss value is higher relative to the second power loss value; and program instructions to assign the plurality of tasks to one or more of the plurality of electronic devices based on the power loss value for the one or more power cables providing power to each of the plurality of electronic devices, including program instruction to assign one or more of the tasks with the second expected power consumption value to the one or more of the plurality of electronic devices having the first power loss value.

12. The computer program product of claim 11, wherein the program instruction to assign the plurality of tasks to the one or more of the plurality of electronic devices based on the power loss value for the one or more power cables providing power to each of the plurality of electronic devices comprises program instructions to assign tasks having the first expected power consumption value to the one or more of the plurality of electronic devices having the second power loss value.

13. The computer program product of claim 11, further comprising:

program instructions to map power distribution paths from the power source to each of the plurality of electronic devices based on at least one characteristic corresponding to each of the one or more power cables providing power to each of the plurality of electronic devices.

14. The computer program product of claim 11, wherein the program instructions to determine the power loss value comprises program instructions to utilize at least one of a power cable length value, a power cable gauge value, a temperature value, and a connector loss value.

15. The computer program product of claim 11, wherein the program instructions to determine the expected power consumption of each of the plurality of tasks comprises program instructions to utilize at least one of an expected power requirement of each task, an observed power usage of previously processed tasks, an expected duration of each task, and an observed duration of previously processed tasks.

* * * * *